Figure 1:
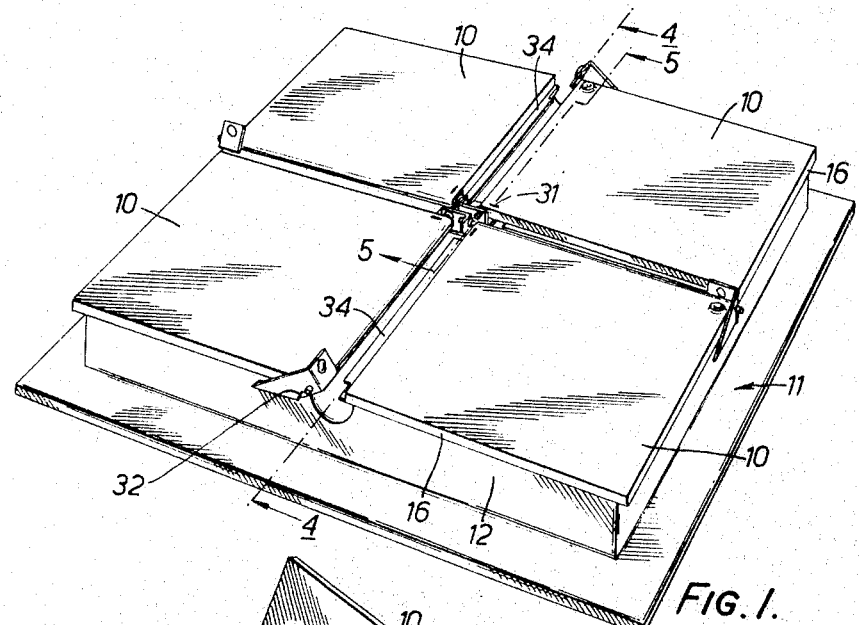

Aug. 8, 1967

H. R. LAMBIE 3,334,569

VENTILATORS

Filed Nov. 25, 1964

6 Sheets-Sheet 1

INVENTOR
Howard Russell Lambie
BY
Russell & Moore
ATTORNEYS

INVENTOR
Howard Russell Lambie
BY
Russell & Moore
ATTORNEYS

Aug. 8, 1967   H. R. LAMBIE   3,334,569
VENTILATORS
Filed Nov. 25, 1964   6 Sheets-Sheet 3
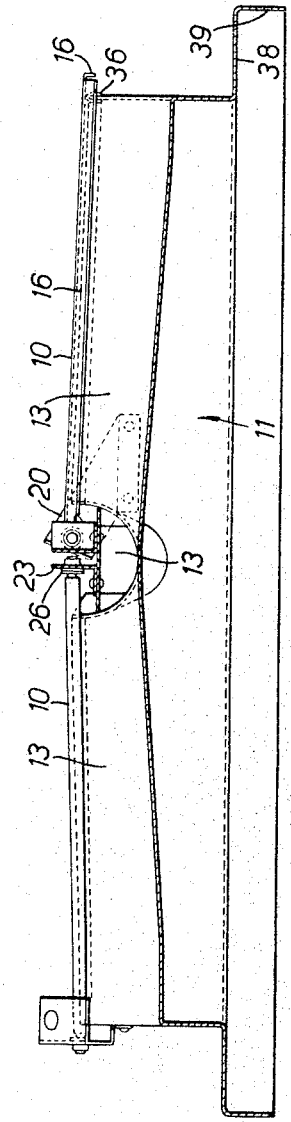
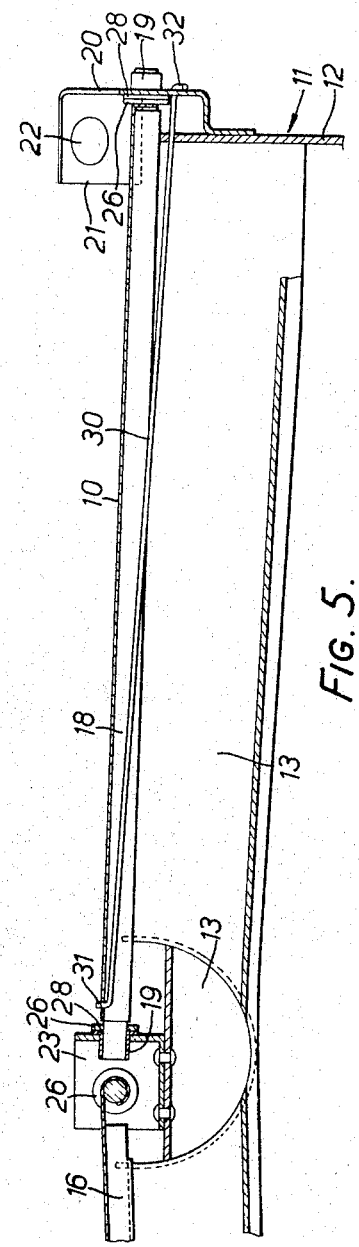
INVENTOR
Howard Russell Lambie
BY
Russell & Moore
ATTORNEYS Aug. 8, 1967   H. R. LAMBIE   3,334,569
VENTILATORS Filed Nov. 25, 1964   6 Sheets-Sheet 4

INVENTOR
Howard Russell Lambie
BY
Russell & Moore
ATTORNEYS

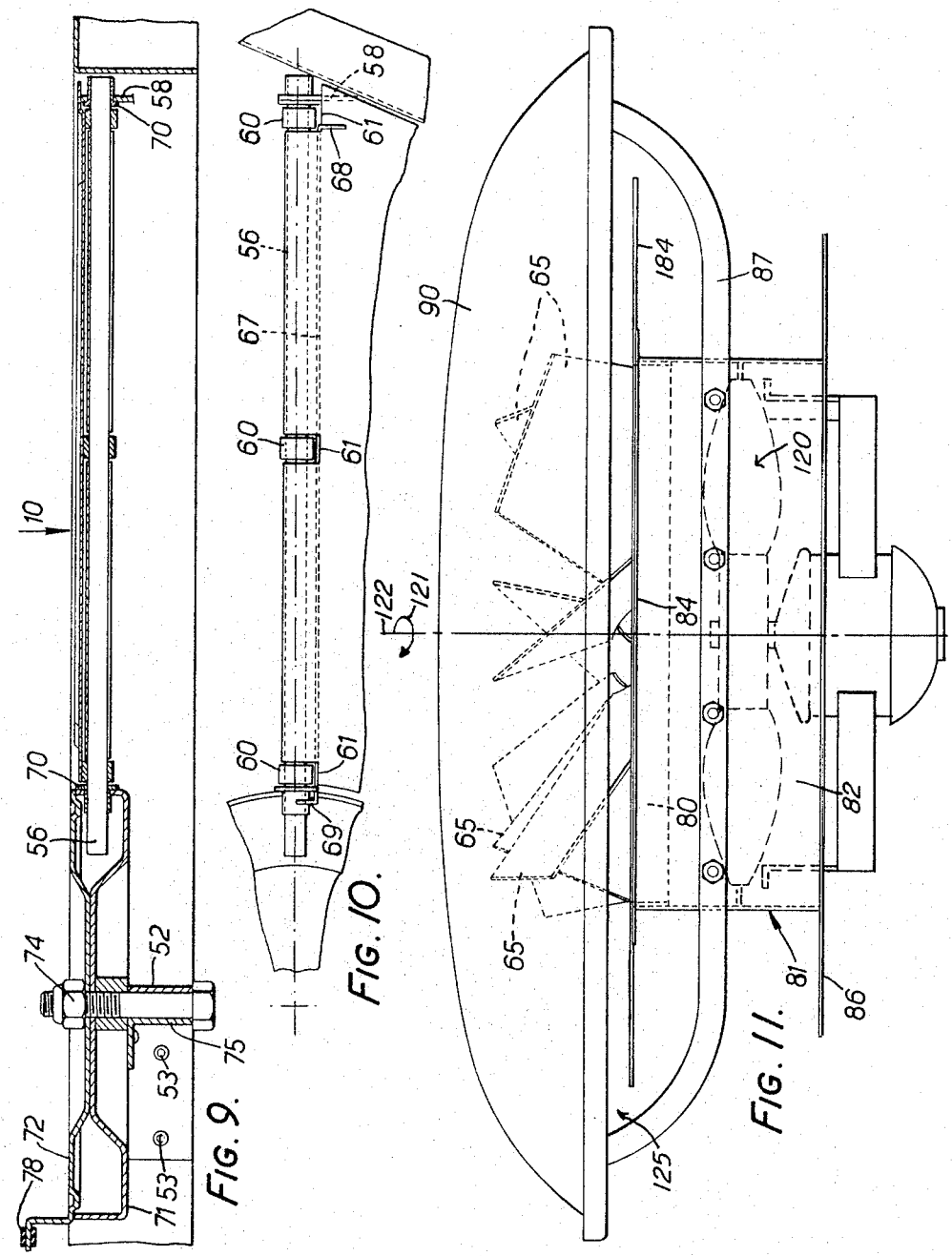

United States Patent Office 3,334,569
Patented Aug. 8, 1967

3,334,569
VENTILATORS
Howard Russell Lambie, Iver Heath, England, assignor to Colt Ventilation & Heating Limited, Surrey, England, a British company
Filed Nov. 25, 1964, Ser. No. 413,715
Claims priority, application Great Britain, Nov. 27, 1963, 46,943/63; June 16, 1964, 24,939/64
5 Claims. (Cl. 98—116)

This invention relates to ventilators and is concerned with powered ventilators having nonreturn shutters.

The purpose of the nonreturn shutters is to close the ventilator when the extraction fan is not operating, to prevent down draught and to conserve the heat in the building.

The usual arrangement hitherto has been to provide shutters in the form of hinged flaps in the exit passage leading from the fan duct and extending completely across the passage, the shutters, for example floating in the air stream created by the extraction fan and closing under the action of gravity when the extraction fan is stopped.

The air leaving the extraction fan follows a helical path which winds about the axis of rotation of the fan and therefore the long axis of the exit passage and shutters as just described offer a considerable resistance to the outflow of air from the fan thereby imposing a marked loss of efficiency in the performance of the ventilator.

This occurs because one half of each shutter lies at an entirely unfavorable angle to the direction of movement of the air approaching it, having regard to the swirling movement of the air. The angle of the shutter is unfavourable if it imposes a large change of direction on the air stream as it strikes the shutter surface and this is inevitable for one half of the shutter if the shutter extends right across the exit passage.

To overcome the difficulty, the present invention broadly provides, in a powered ventilator employing an extraction fan, a nonreturn shutter assembly in which the shutters are hinged on axes radiating from the centre of the assemblage, all the shutters being arranged to open in the same rotational direction as viewed from the centre looking radially outwardly depending upon the direction of rotation of the extraction fan.

If the shutter assemblage is for use with an extraction fan which rotates clockwise as viewed from upstream of the fan then the shutters are aranged to open clockwise as viewed from the centre looking radially outwardly. If the fan rotates anticlockwise as viewed from upstream of the fan the shutters are arranged to open anticlockwise as viewed from the centre looking radially outwardly.

With either arrangement, the whole of each shutter is disposed at a favourable angle in the air stream from the fan when the shutters are open and in this way the resistance to the outflow of the air is reduced.

Preferably, the shutters all extend on the same side of their hinge axes when viewed from the centre looking radially outwardly, each shutter being hinged along one edge.

An arrangement as just described is suitable for automatic opening by the air stream and for closure under gravitational action when used in conjunction with an upward discharge ventilator. In this case the shutters take up a horizontal or near horizontal position when closed. If the discharge is at an angle due to the pitch of the roof, light stainless steel springs may be employed urging the shutters to their closed position. These springs also offset any tendency for the shutters to open and close momentarily under gusty wind conditions when the fan is not in use and for this purpose corresponding springs may be employed to supplement the gravitational action in an arrangement where the shutters are horizontal or nearly horizontal when closed.

A shutter assemblage according to the present invention may be designed for use with a cowl, in which case the shutters need function only to prevent natural ventilation and downdraught when closed and not rain or snow entry. If a cowl is to be used, it is preferred to employ a fairly large number of shutters, for example eight, so as to reduce the height of the assemblage when the shutters are open. The number of shutters employed under these conditions is governed generally speaking by the requirement to block the air outflow path as little as possible and the least number of shutters consistent with obtaining an acceptable opening height is therefore the aim.

The cowl, of course, also offers resistance to the outflow of the air and, accordingly, for some applications it is preferred so to design a shutter assemblage according to the present invention that it can itself function to prevent weather entry when the shutters are closed and to rely on the forced draught created by the extraction fan through the shutters when the shutters are open to prevent the entry of water or snow under the latter conditions.

The forced draught necessary for this purpose requires a high fan speed by normal standards. In other words, a shutter assemblage according to this invention, intended for use without a cowl, is for a special kind of ventilator used only in tough environments where the fan can be run at high speed without fear of noise nuisance and where it is necessary to disperse airbone deposits upwardly well clear of the surrounding roof surface.

Figure 2:
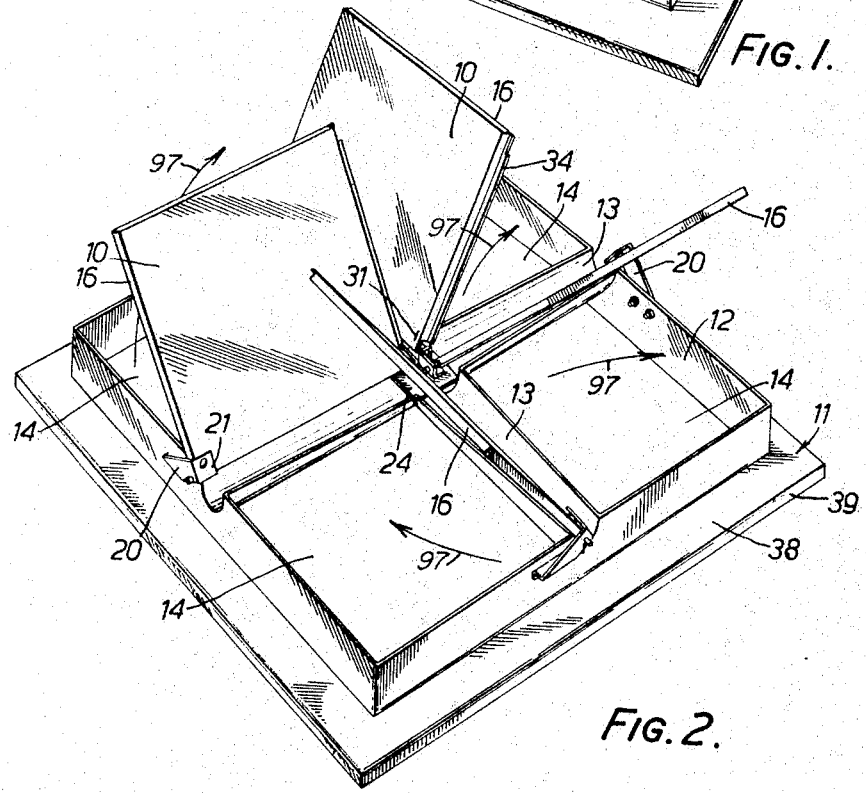
Figure 3:
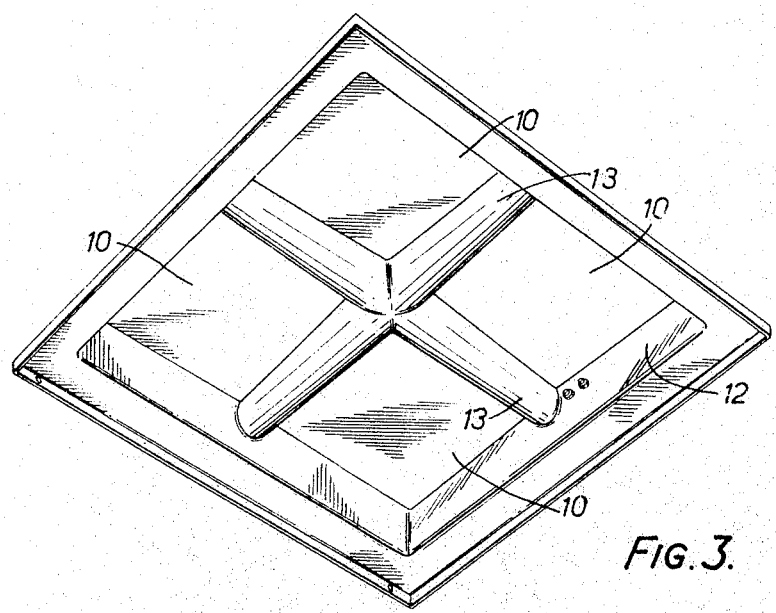
Figure 6:
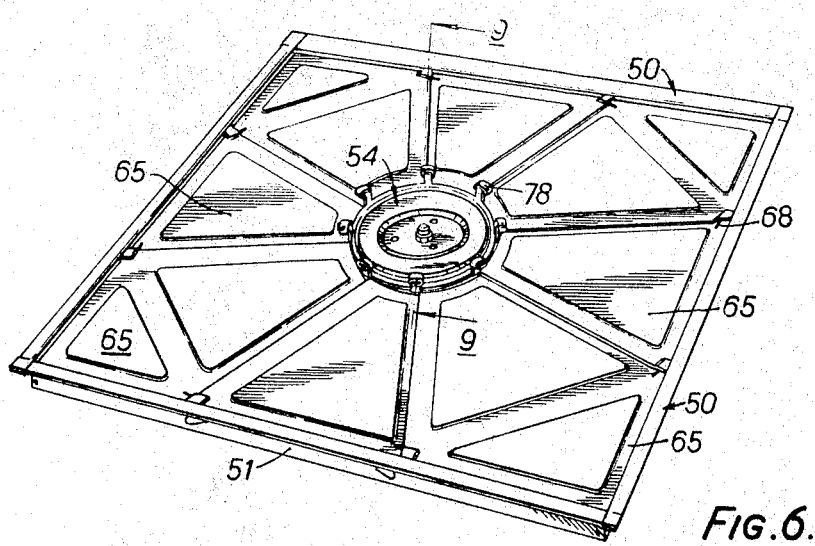
Figure 7:
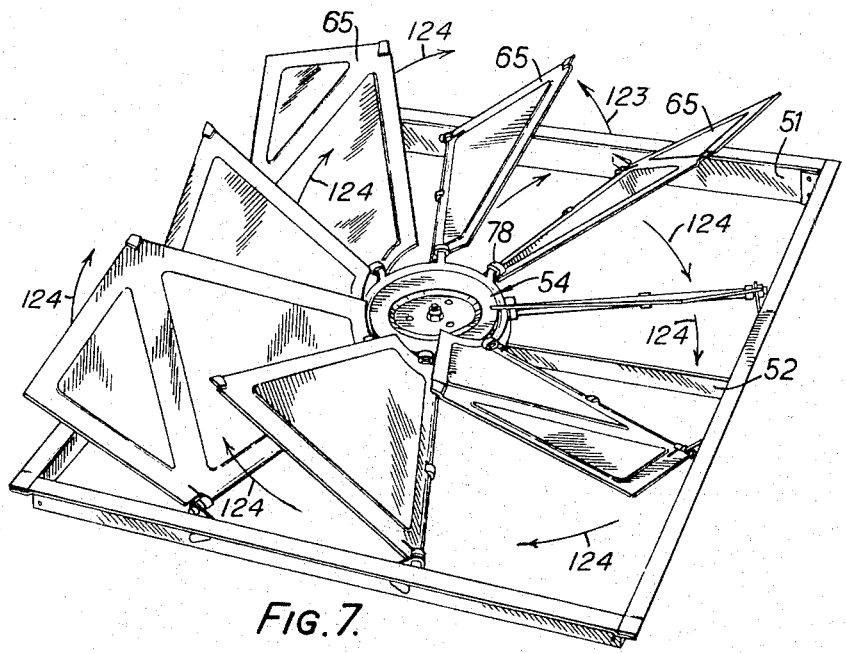
Figure 8:
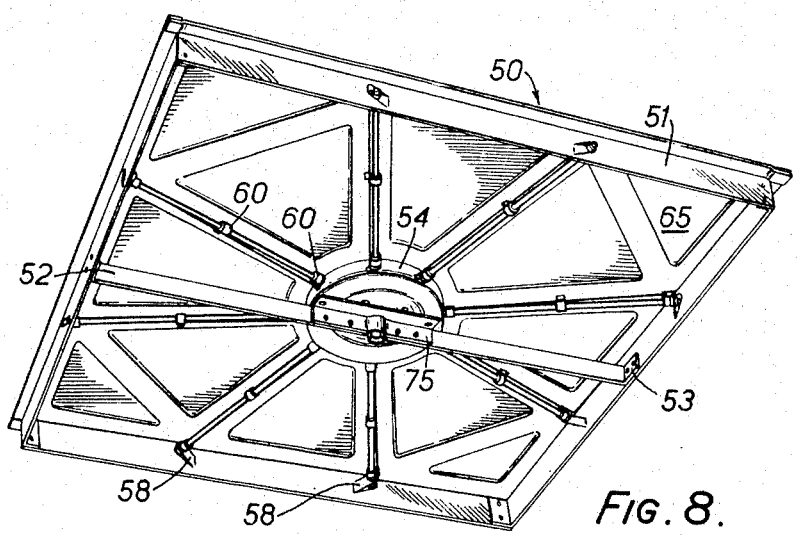
Figure 12:
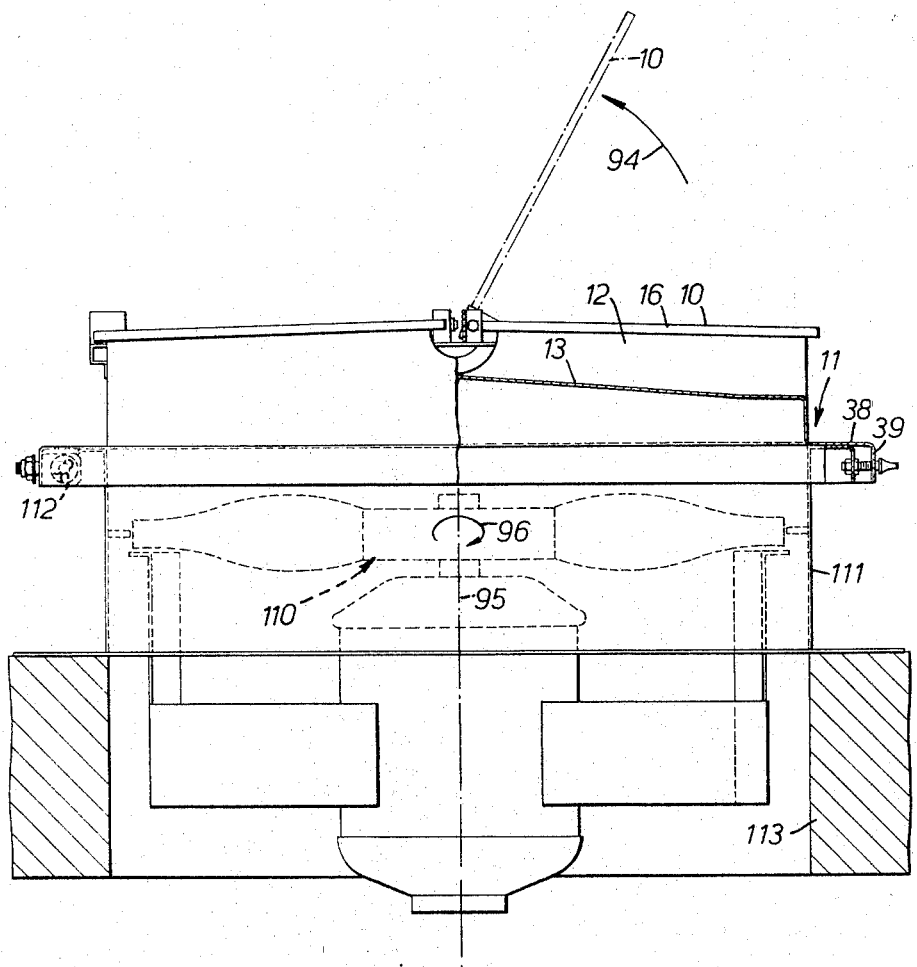

Specific embodiments of the present invention will now be described, merely by way of example, with reference to the accompanying drawings in which:

FIG. 1 is a perspective view of a shutter assemblage for a ventilator according to the present invention intended for use in a powered upward discharge ventilator having no cowl, and generally as illustrated in FIG. 12, the shutters being shown in their closed position, FIG. 2 is a perspective view corresponding with FIG. 1 but showing the shutters in their open position, FIG. 3 is a perspective view from below of the shutter assemblage shown in FIG. 1, FIG. 4 is a cross-section on line 4—4 in FIG. 1, FIG. 5 is a scrap view in cross-section on line 5—5 in FIG. 1, FIG. 6 is a perspective view of a further shutter assemblage for a ventilator according to the present invention intended for use with a powered upward discharge ventilator provided with a cowl, the shutters being shown in their closed position, FIG. 7 is a perspective view corresponding with FIG. 6 but showing the shutters in their open position, FIG. 8 is a perspective view from below of the shutter assemblage shown in FIG. 6, FIG. 9 is a scrap view in cross-section on line 9—9 of FIG. 6, FIG. 10 is a scrap view in the direction of arrow 10 in FIG. 9, certain parts having been removed to show details of construction, and FIG. 11 shows the assemblage of FIGS. 6 to 10 inclusive in a powered discharge ventilator according to the invention provided with a cowl, the shutters being shown in their open position, and FIG. 12 shows the assemblage of FIGS. 1 to 5 inclusive in a powered upward discharge ventilator according to the invention having no cowl, the shutters being shown in their closed position.

Referring to FIGS. 1 to 5, the shutters 10 overlie a frame part of the assemblage, generally indicated at 11, all round their periphery so that water drains off the shutters on to the frame which is designed and arranged to lead off the water to the outside of the frame so that it eventually passes onto the roof surface, the frame having an outer part defining the mouth of the exit passage for the air discharged by the fan. Specifically, in the present example, four hinged shutters 10 are employed mounted in a square outer frame 11 having a wall 12 defining the mouth of the exit passage for the upward discharge of the air. This frame has two cross members 13, 13 at right angles dividing the mouth into four generally square apertures 14, the cross members being of round, channel section and open upwards to act as gutters which communicate with one another at the centre, the outer ends of the gutter arms opening through the wall 12 of the outer frame to lead off water collecting in the gutters clear of the mouth for discharge on to the surrounding roof. Hinged on the frame 11 are the four shutters which are square and which, in their closed position, cover over the apertures 14 described above, one shutter being provided for each aperture. Each shutter has a downturned flange 16 along each of its four edges, two of which flanges fit over the mouth defining wall 12 of the outside frame and the other two of which each depend into the gutters 13, 13 defining the aperture 14 closed by the shutter.

Each shutter is hinged on a hinge rod 18 (see FIGS. 4 and 5) radiating from the centre of the assemblage. The four hinge rods 18 generally overlie the four gutter arms respectively and are supported at their ends in light-stabilised nylon bushes 19 carried by hinge brackets. Thus, a separate hinge bracket 20 is provided to support the outer end of each hinge rod 18 the bracket being bolted or riveted to the wall 12 and having an angled part 21 overlying the shutter on the hinge rod, the angled part carrying a rubber grommet plug 22 which acts as a stop limiting the opening of the shutter to an angle of about 50° in the present example.

The inner ends of the hinge rods 18 are likewise supported in light-stabilised nylon bushes 19 carried, in pairs, by two hinge brackets 23 each consisting of three flat plate parts mutually at right angles, one lying flat on and being riveted to a central platform plate 24 supported in the junction of the gutters 13 and the other two upstanding therefrom and supporting the inner ends of two adjacent hinge rods 18. The shutters, like the frame and gutters, are composed of aluminium sheet material and the sheet material of the shutters is wrapped about the hinge rods to secure the shutters thereto. Washers 26 are provided on the hinge rods between locating flanges 28 on the nylon bushes and the shutters, the flanges 28 lying flat against the bracket faces adjacent the shutters. The hinge rods 18 turn in the bushes to accommodate opening and closing of the shutters. Each shutter is urged to its closed position by a straight, torsion rod spring 30 of stainless steel having hooked ends lodged as at 31, 32 in holes in the shutter and its outer hinge rod support bracket 20 respectively. The spring rod extends generally parallel with and close to the hinge axis of the shutter and the arrangement is such that the rod is twisted and, to a small extent, bent as the shutter opens. In the closed position of the shutter the rod is pre-loaded in torsion whereby the shutter is held closed by spring action.

The down turned flange 16 along the hinged edge of each shutter is curved about the shutter hinge rod but since the hinge rod wholly overlies one of the gutter arms, water running off the hinge rod edge of the shutter is collected by the gutter and led off onto the surrounding roof surface.

The arrangement of the shutters is such that they slope downwardly at a small angle from their hinged edge towards their front edge, i.e. that edge which is parallel with their hinged edge, to carry off water falling on the shutters clear of the mouth of the exit passage defined by the wall 12. Each shutter also slopes from side to side, that is to say, from its side edge overlying a gutter arm down towards its side edge adjacent the wall 12. The down turned flange 16 at its side edge overlying a gutter arm carries an additional, outwardly directed flange 34 extending towards the adjacent shutter hinge rod, to afford extra weathering when the shutters are closed.

The gutter arms are inclined downwardly and taper somewhat from the centre towards their extremities, as may clearly be seen in FIG. 4.

The walls 12 carry neoprene rubber stops 36 (see FIG. 4) on which the shutters seat when in their closed position. The stops assist in silencing the closing movement of the shutters under the action of the shutter springs when the fan is stopped.

The shutters all extend on the same side of their hinge axes as viewed from the centre platform 24 loking radially outwards and each opens in the same rotational direction as viewed in the radially outward direction, depending upon the direction of rotation of the fan as previously explained. The assemblage as just described and illustrated is used with a fan 110 which rotates anticlockwise as viwed from upstream of the fan, the shutters 10 opening anticlockwise as viewed from the centre looking radially outward. Thus, for example, the shutter 10 shown in chain dotted outline in its open position in FIG. 12 opens in the direction of arrow 94. This is anticlockwise looking outwardly along the hinge rod of the shutter from the platform 24. In FIG. 12 the shutter assemblage is shown in section on the right hand side of the figure. The section corresponds with the section taken in FIG. 4 and the shutter 10 shown in chain dotted line in FIG. 12 is the shutter appearing on the right hand side in FIG. 4, and correspondingly, in the far corner of the assemblage in FIG. 1.

By employing four shutters only, only four gutter arms 13 are required extending across the air exit passage defined by the wall 12 and the area of the exit passage blocked by the gutter arms is therefore kept within acceptable limits. Since there are only four shutters, the open height of the shutter assemblage is increased, as compared with the case where a greater number of shutters are used, but this is not unacceptable when no cowl has to be provided.

The frame 11, in addition to the wall 12, includes an outwardly directed flange 38 having a downturned rim 39. The flange 38 is intended to seat on a pedestal structure 111 housing the fan 110 and the shutter unit as described is hinged to the pedestal structure 111 as at 112 so that it may be swung back to give access to the fan motor unit. The pedestal structure 111 is flashed to the roof 113.

In operation, the shutters 10 float open on the airstream from the fan 110, and in view of their arrangement, the shutters offer only a small resistance to the outflow of the air for the reasons previously explained. The fan 110 rotates anticlockwise as viewed from upstream of the fan and produces a helical swirling movement of the air about the axis 95 of the fan in the direction of arrow 96 (see FIG. 12). When open therefore all the shutters 10 are disposed wholly at a favourable angle in the swirling airstream, which approaches each shutter generally in the direction of the plane of the shutter as indicated by the arrows 97 in FIG. 2. When the fan is shut down the shutters close automatically to prevent weather entry. The shutter stops 22 limit the maximum opening of the shutters and prevent their jamming one another in an open position.

FIGS. 6 to 10 illustrate a shutter assemblage, intended for use with a powered, upward discharge ventilator provided with a cowl and which may be of the form illustrated in FIG. 11 by way of example. The shutter assemblage has a square outer frame 50 with a wall 51 defining the mouth of the exit passage from the fan as before, the mouth of the exit passage, in this case, being covered by the cowl. Carried at the centre of the frame by a transverse strap 52 connected at its two ends as at 53 to the frame 50 is a hub 54 for supporting the inner ends of eight radiating, equi-angularly spaced hinge rods 56 (see FIGS. 9 and 10) the outer ends of which are journalled in support arms 58 pressed out from the sheet material of the wall 51 the outer frame and the inner ends of which are journalled in the hub. The hub takes the form of a shallow, cylindrical lidded box, the interior of which contains the journalled inner ends of the hinged rods 56. Each hinge rod 56 carries a shutter 65. Anti-rattle buffers 60 threaded on the hinge rod lie in notches 61 in the hinged side of each shutter one centrally and one at each end. These buffers which are of synthetic plastic material, e.g. P.V.C., prevent end rattle of the shutters and opening and also closing rattle of the shutters the front edge of each shutter resting on and being supported by the buffers 60 on the ringe rod of the adjacent shutter when the shutters are closed. The shutters all extend on the same side of their hinge rods 56 as viewed from the hub 54 looking radially outwardly and each opens in the same rotational direction as viewed in the radially outward direction depending on the direction of rotation of the fan 120 as previously explained. The hinge rods extend symmetrically in pairs, two from the hub towards each side of the frame 50. The shutters 65 are shaped to correspond with the spaces defined between adjacent pairs of hinge rods, the hub 54, and the outer frame 51, the shutters fitting with a small clearance in the spaces, except at their front edges where they overlap the adjacent edge of the adjacent shutter whereby the shutters are supported on the buffers 60 as described above.

This arrangement of shutters effectively prevents down draughts when the fan is not operating and the shutters are closed. The shutters while effectively closing the entry for normal purposes do not seal the mouth of the exit passage. This is because the mouth of the exit passage is protected against weather entry by the cowl. The shutters 65 which extend into the four corners of the frame 51 are five sided shutters, and the remaining four alternate shutters 65 having four sides. In the present example the shutters are of sheet aluminium and are pressed out or dished so as to give them greater rigidity. The shutters may be composed of synthetic plastics material if desired. Each shutter is urged to its closed position by a torsion rod spring 67 generally as previously described. In the present example the hooked outer end of the spring rod engages the shutter, as at 68, and the hooked inner end engages the hub 54 as at 69 (see FIG. 10).

Each shutter is rolled about its hinge rod to connect it thereto. The hinge rods are journalled in light-stabilised nylon bushes 70 arranged generally as previously described. The hub 54 has a box part 71 and a lid part 72 closing the box part. The parts 71 and 72 are centrally dished and engage one another to define an annular space housing the inner ends of the hinge rods. A central bolt connection 74 secures the lid part and the box part together and to the strap 52, the strap carrying an angle piece 75 shaped to define, with the strap 52, a hole for the bolt, the angle piece being riveted to the box part 71.

In the last described construction of shutter assemblage for use with a cowl, the shutters may be allowed to float freely upwardly in the discharging air stream so as to offer the least resistance to the discharge of air past the shutters. Under these conditions, it will be understood, the shutters impose very little change of direction on the air stream and therefore, resistance to the outflow of air, as previously explained. The cowl which is to be used with the shutter assemblage must however impose a significant change of direction on the air stream since its function inherently requires it to block the flow path from the shutters. The design of the cowl would be consistent with obtaining the least resistance to outflow having regard to its functional and the aesthetic requirements. It has been found that the design of the cowl can be assisted in these respects by having the shutters guide the air flow towards the cowl outlet. The resistance to outflow by the shutters is, in this way, increased but the overall efficiency of the ventilator including the cowl is improved so that an optimum result is achieved.

FIG. 11 illustrates the shutter assemblage of FIGS. 6 to 10 in a powered ventilator having a cowl of low profile, the shutter assemblage being generally indicated at 80 and shown with the shutters in a fully open position. The cowl comprises a pedestal base 81 having an upwardly directed trunk or throat 82 housing a fan-motor unit 120. The trunk has an outwardly directed flange 84 at its upper end on which the shutter assemblage 80 is loacted. At its lower end the trunk has an outwardly directed flange 86 intended to be flashed to the roof.

Chassis bars 87 fixed to the pedestal base support a shallow hood 90 which extends like an umbrella over the mouth of the air exit passage formed by the trunking 81 so as to protect the mouth of the air exit passage against weather entry.

The lid part 72 of the hub 54 of the shutter assemblage carries a series of stops 78 one for each shutter and limiting the opening of the shutters to 50°, this slightly increases the resistance to outflow of air by the shutters but it has the effect that the subsequent air flow path to the outlet under the edge of the hood 90 is made much easier, resulting in an overall improvement in efficiency. Thus when the shutters are against the stops 78 they guide the air flow in part towards the edge of the hood.

After leaving the shutters, the air impinges against the hood and is guided thereby towards its edge. The hood in the present example is smoothly curved in cross-sections and has an edge which is generally square in outline but with rounded corners. In order to prevent the entrainment under the hood of air from the space surrounding the hood and base into which the air extracted by the fan is being discharged, a flange 84 at the upper end of the pedestal base may extend out well towards but not beyond the edge of the hood, so that the air outlet 125 defined between the edge of the flange and the edge of the hood is directed downwardly but at a large angle to the rotational axis 122 about which the air emerges from the shutter assemblage. The flange now referred to is conveniently formed on the shutter assemblage and rests on the flange 84 of the pedestal base.

In addition to preventing the entrainment of air under the hood the flange also acts as a splash guard to prevent splashing of water from the roof surface up inside the hood and into the trunk of the pedestal base.

The fan 120 rotates anticlockwise as viewed from upstream of the fan. The air leaving the fan has a helical swirl in the direction of arrow 121 about the axis 122 of the fan. Each shutter 65 opens anticlockwise, e.g. in the direction of arrow 123 in FIG. 7, as viewed from the central hub 54 looking radially outwardly along the hinge axis of the shutter. The air emerges through the shutter assemblage as indicated by the arrow 124 in FIG. 7.

I claim:

1. A powered ventilator comprising a housing defining an air exit passage for extracted air, an extraction fan mounted in the housing which fan, in operation, impels air extracted by the fan through said air exit passage with a swirling motion and a nonreturn shutter assemblage downstream of the fan in the swirling airstream and operable to close said air exit passage when the extraction fan is not operating, the nonreturn assemblage comprising a plurality of hinged shutters hinged on axes radiating from the center of the assemblage, said shutters being movable about their hinge axes between open and closed positions, to open from their closed position all shutters in the same rotational direction as viewed from the center of the nonreturn shutter assemblage looking radially outwardly along the respective hinge axes of the shutters, the rotational direction of movement of the shutters when moving from their closed position to their open position corresponding to the direction of rotation of the fan as viewed from upstream of the fan, means having a self weathering nonreturn shutter assemblage in which the shutters all extend on the same side of their hinge axes when viewed from the centre of the nonreturn shutter assemblage looking radially outwardly along the hinge axes, each shutter being hinged along one edge and the shutters being adapted to float open automatically on the airstream discharged by the fan, the nonreturn shutter assemblage acting to weather the air exit passage when the extraction fan is not operating, the nonreturn shutter assemblage comprising a frame having an outer part which defines the mouth of said exit passage and said shutters being hinged to the said frame, each shutter overlying the frame all round the peripheral edge of the shutter when the shutter is in its closed position, the hinged edge of each shutter overlying a gutter member of the frame and the gutter members opening through said outer part of the frame to lead off water collecting in the gutter members clear of the mouth of said exit passage.

2. A ventilator as claimed in claim 1 in which each shutter has a first side edge distinct from its hinged edge overlying one of said gutter members and a further pair of side edges distinct from its hinged edge which intersect at a corner of the shutter, said further pair of side edges overlying said outer part of the frame.

3. A ventilator as claimed in claim 1 in which the outer part of the frame is square, in which two gutter members are provided crossing the outer part of the frame at right angles to one another to define with the frame four generally square apertures in the mouth of the exit passage and in which four square shutters are provided one to close each of said apertures, the shutters in their closed position, being downwardly inclined from their hinged edge towards their front edge parallel with their hinged edge and from their first side edge overlying a gutter member towards their opposite side edge.

4. A powered ventilator comprising a housing defining an air exit passage for extracted air, an extraction fan mounted in the housing which fan, in operation, impels air extracted by the fan through said air exit passage with a swirling motion and a nonreturn shutter assemblage downstream of the fan in the swirling airstream and operable to close said air exit passage when the extraction fan is not operating, the nonreturn shutter assemblage comprising a plurality of hinged shutters hinged on axes radiating from the center of the assemblage, said shutters being movable about their hinge axes between open and closed positions, to open from their closed position all shutters in the same rotational direction as viewed from the center of the nonreturn shutter assemblage looking radially outwardly along the respective hinge axes of the shutters, the rotational direction of movement of the shutters when moving from their closed position to their open position corresponding to the direction of rotation of the fan as viewed from upstream of the fan, means wherein said housing is formed as part of a cowl having a hood covering over said exit passage and weathering the nonreturn shutter assemblage, the assemblage comprising stops limiting the opening of the shutters whereby the shutters when engaging the stops act to guide air discharged by the fan through the assemblage in part towards the edge of the hood.

5. A ventilator as claimed in claim 4 in which a flange is provided extending outwardly from said housing generally towards the edge of the hood the flange having its outer edge spaced inwardly from the edge of the hood to define therewith a downwardly directed air outlet from the cowl.

References Cited

UNITED STATES PATENTS

| 1,532,635 | 4/1925 | Osbun | 98—116 |
| 2,153,604 | 4/1939 | Wheller | 116—122 X |
| 2,687,687 | 8/1954 | Prudhon | 98—119 X |
| 2,783,702 | 3/1957 | O'Day | 98—111 X |

FOREIGN PATENTS 668,164 11/1938 Germany.

ROBERT A. O'LEARY, Primary Examiner.

MEYER PERLIN, Examiner.

M. A. ANTONAKAS, Assistant Examiner.